(12) United States Patent
Hashimoto et al.

(10) Patent No.: US 10,508,161 B2
(45) Date of Patent: Dec. 17, 2019

(54) MODIFIED HYDROCARBON RESIN, METHOD FOR PRODUCING THE RESIN, AND HOT-MELT ADHESIVE COMPOSITION

(71) Applicant: ZEON CORPORATION, Chiyoda-ku, Tokyo (JP)

(72) Inventors: Sadaharu Hashimoto, Tokyo (JP); Ryoji Kameyama, Tokyo (JP); Yoshifumi Maruyama, Tokyo (JP)

(73) Assignee: ZEON CORPORATION, Chiyoda-ku, Tokyo (JP)

(*) Notice: Subject to any disclaimer, the term of this patent is extended or adjusted under 35 U.S.C. 154(b) by 0 days.

(21) Appl. No.: 15/761,559

(22) PCT Filed: Sep. 28, 2016

(86) PCT No.: PCT/JP2016/078695
§ 371 (c)(1),
(2) Date: Mar. 20, 2018

(87) PCT Pub. No.: WO2017/057500
PCT Pub. Date: Apr. 6, 2017

(65) Prior Publication Data
US 2018/0258198 A1    Sep. 13, 2018

(30) Foreign Application Priority Data

Sep. 29, 2015 (JP) ................................. 2015-190972

(51) Int. Cl.
| | | |
|---|---|---|
| C08F 8/46 | (2006.01) |
| C08F 240/00 | (2006.01) |
| C08C 19/28 | (2006.01) |
| C09J 115/00 | (2006.01) |
| C08F 236/04 | (2006.01) |
| C09J 145/00 | (2006.01) |
| C09J 147/00 | (2006.01) |

(52) U.S. Cl.
CPC ............. *C08F 8/46* (2013.01); *C08C 19/28* (2013.01); *C08F 236/045* (2013.01); *C08F 240/00* (2013.01); *C09J 115/00* (2013.01); *C09J 145/00* (2013.01); *C09J 147/00* (2013.01)

(58) Field of Classification Search
CPC ............................ C08F 236/045; C08F 36/045
See application file for complete search history.

(56) References Cited

U.S. PATENT DOCUMENTS

2004/0171778 A1* 9/2004 Donker ............... C08F 236/045
526/290
2011/0280922 A1* 11/2011 Ron ........................ A61F 13/20
424/431

FOREIGN PATENT DOCUMENTS

| GB | 1486211 A | 9/1977 |
| JP | S50124984 A | 10/1975 |
| JP | H07188352 A | 7/1995 |
| JP | H1072556 A | 3/1998 |
| JP | 2002322450 A | 11/2002 |
| JP | 2003530471 A | 10/2003 |
| JP | 2004502839 A | 1/2004 |
| JP | 2006206850 A | 8/2006 |
| JP | 2014198806 A | 10/2014 |
| WO | 0177196 A1 | 10/2001 |
| WO | 0204530 A2 | 1/2002 |
| WO | 2005082953 A1 | 9/2005 |

OTHER PUBLICATIONS

Apr. 3, 2018, International Preliminary Report on Patentability issued in the International Patent Application No. PCT/JP2016/078695.
Oct. 25, 2016, International Search Report issued in the International Patent Application No. PCT/JP2016/078695.
Apr. 18, 2019, the Extended European Search Report issued by the European Patent Office in the corresponding European Patent Application No. 16851671.4.

* cited by examiner

*Primary Examiner* — Mark S Kaucher
(74) *Attorney, Agent, or Firm* — Kenja IP Law PC

(57) ABSTRACT

Provided are a modified hydrocarbon resin that can provide a hot-melt adhesive composition with low odor, low Gardner color and high peel adhesion, a method for producing the resin, and the hot-melt adhesive composition. A modified hydrocarbon resin comprising a 1,3-pentadiene monomer unit, a C4-C6 alicyclic monoolefin monomer unit, a C4-C8 acyclic monoolefin monomer unit, an alicyclic diolefin monomer unit, and an aromatic monoolefin monomer unit, and containing a carboxyl group or acid anhydride group, wherein a weight average molecular weight (Mw), a Z average molecular weight (Mz), a ratio (Mz/Mw), a Gardner color scale of a 50 mass % toluene solution, a softening point, and an acid value are in specific ranges.

6 Claims, No Drawings

MODIFIED HYDROCARBON RESIN, METHOD FOR PRODUCING THE RESIN, AND HOT-MELT ADHESIVE COMPOSITION

TECHNICAL FIELD

The present invention relates to a modified hydrocarbon resin, a method of producing the resin, and a hot-melt adhesive composition. More specifically, the present invention relates to a modified hydrocarbon resin that can provide a hot-melt adhesive composition with low odor, low Gardner color and high peel adhesion, a method for producing the resin, and the hot-melt adhesive composition.

BACKGROUND ART

A hot-melt adhesive is solidified for a short period of time. Therefore, it can efficiently attach various kinds of products to each other. Moreover, since the adhesive does not need solvent, it is an adhesive with high safety to the human body and thus is used in various fields. For example, the hot-melt adhesive is used as a sealing adhesive for papers, cardboards and films used for packaging of foods, clothes, electric devices and cosmetic products. In the production of sanitary products such as paper diapers and women's sanitary products, the hot-melt adhesive is used as an adhesive for attaching components constituting them, or as an adhesive constituting an adhesive layer of adhesive tapes or labels.

In general, the hot-melt adhesive is produced by adding a tackifier resin, etc., to a base polymer. In recent years, an attempt to use, as the tackifier resin, a modified hydrocarbon resin obtained by the action of an acid or acid anhydride on a hydrocarbon resin, has attracted attention. It is known that such a modified hydrocarbon resin imparts, to the hot-melt adhesive, novel properties that conventional tackifier resins do not have (water-resistant adhesion, etc.)

For example, Patent Literature 1 discloses a modified hydrocarbon resin having an acid value of from 1 (mgKOH/g) to 150 (mgKOH/g) and a weight average molecular weight of from 300 to 5000 and being obtained by graft copolymerization of a hydrocarbon resin, which is obtained by copolymerization of 100 parts by weight of a vinyl aromatic hydrocarbon with 5 parts to 100 parts by weight of a hydrocarbon mainly composed of a C4-05 unsaturated hydrocarbon, with at least one selected from the group consisting of monoolefindicarboxylic acid and anhydrides thereof. The modified hydrocarbon resin is effective in some adhesives comprising acryl-based base polymers; however, it has poor compatibility with adhesives comprising ethylene-based base polymers or rubber-based base polymers and cannot obtain sufficient adhesion. Also, the modified hydrocarbon resin has a problem of residual monomer-derived odor, since the copolymerization amount of the vinyl aromatic hydrocarbon is large.

Patent Literature 2 discloses an acid-modified hydrocarbon resin which comprises reaction products such as a C5 unsaturated aliphatic hydrocarbon monomer, an isoolefin monomer, and dicarboxylic acid or acid anhydride, and which has a predetermined acid value and a predetermined composition ratio. However, the acid-modified hydrocarbon resin has very poor hue, and the resin has a problem of odor when it is in a hot-melt state at high temperature.

CITATION LIST

Patent Literature 1: Japanese Patent Application Laid-Open No. H7-188352
Patent Literature 2: Japanese translation of PCT international application No. 2004-502839

SUMMARY OF INVENTION

Technical Problem

In light of the above circumstance, an object of the present invention is to provide a modified hydrocarbon resin that can provide a hot-melt adhesive composition with low odor, low Gardner color and high peel adhesion, and the hot-melt adhesive composition.

Solution to Problem

To achieve the above object, the inventors of the present invention made considerable research and found that a modified hydrocarbon resin with low Gardner color can be obtained by synthesizing a hydrocarbon resin by addition polymerization of a monomer mixture having a specific composition, and acid-modifying the hydrocarbon resin. The inventors of the present invention also found that a hot-melt adhesive composition with low odor, low Gardner color and high peel adhesion can be obtained by using the modified hydrocarbon resin. The present invention was achieved in light of these findings.

According to the present invention, a modified hydrocarbon resin is provided, the resin comprising: 20 mass % to 70 mass % of a 1,3-pentadiene monomer unit, 10 mass % to 35 mass % of a C4-C6 alicyclic monoolefin monomer unit, 5 mass % to 30 mass % of a C4-C8 acyclic monoolefin monomer unit, 0 mass % to 1 mass % of an alicyclic diolefin monomer unit, and 10 mass % to 40 mass % of an aromatic monoolefin monomer unit, and containing a carboxyl group or acid anhydride group, wherein a weight average molecular weight (Mw) of the resin is from 1,000 to 4,000; a Z average molecular weight (Mz) of the resin is from 2,500 to 10,000; a ratio (Mz/Mw) between the Z average molecular weight and the weight average molecular weight is from 1.5 to 2.5; a Gardner color scale of a 50 mass % toluene solution is 5 or less; a softening point of the resin is 30° C. or more; and an acid value of the resin is from 1 KOHmg/g to 20 KOHmg/g.

According to the present invention, a method for producing the modified hydrocarbon resin is provided, the method comprising: a polymerization step in which a monomer mixture A comprising: 20 mass % to 70 mass % of 1,3-pentadiene, 10 mass % to 35 mass % of a C4-C6 alicyclic monoolefin, 5 mass % to 30 mass % of a C4-C8 acyclic monoolefin, 0 mass % to 1 mass % of an alicyclic diolefin, and 10 mass % to 40 mass % of an aromatic monoolefin, is cationically polymerized at 65° C. or less using, as a polymerization catalyst, a halogenated aluminum (A) and a halogenated hydrocarbon (B) selected from the group consisting of a halogenated hydrocarbon (B1) in which a halogen atom is bound to a tertiary carbon atom and a halogenated hydrocarbon (B2) in which a halogen atom is bound to a carbon atom adjacent to a carbon-carbon unsaturated bond, and a modification step in which a resin obtained by the polymerization step is acid-modified by reaction with a unsaturated carboxylic acid or unsaturated dicarboxylic anhydride.

According to the production method of the present invention, it is preferable that in the polymerization step, first, a mixture M is prepared by mixing the halogenated aluminum (A) and the alicyclic monoolefin, and next, the mixture M is mixed with a mixture a containing at least the 1,3-pentadiene, the acyclic monoolefin and the aromatic monoolefin.

According to the production method of the present invention, it is preferable that in the polymerization step, the mixture a and the mixture M are further mixed with the halogenated hydrocarbon (B).

According to the present invention, a hot-melt adhesive composition comprising the modified hydrocarbon resin and an ethylene-vinyl acetate copolymer is provided.

For the hot-melt adhesive composition according to the present invention, it is preferable that a vinyl acetate monomer unit content of the ethylene-vinyl acetate copolymer is from 15 mass % to 35 mass %.

Advantageous Effects of Invention

According to the present invention, the modified hydrocarbon resin that can provide the hot-melt adhesive composition with low odor, low Gardner color and high peel adhesion, can be provided.

DESCRIPTION OF EMBODIMENTS

Hereinafter, the present invention will be described in detail.

1. Modified Hydrocarbon Resin and its Production Method

The modified hydrocarbon resin according to the present invention is a modified hydrocarbon resin comprising: 20 mass % to 70 mass % of a 1,3-pentadiene monomer unit, 10 mass % to 35 mass % of a C4-C6 alicyclic monoolefin monomer unit, 5 mass % to 30 mass % of a C4-C8 acyclic monoolefin monomer unit, 0 mass % to 1 mass % of an alicyclic diolefin monomer unit, and 10 mass % to 40 mass % of an aromatic monoolefin monomer unit, and containing a carboxyl group or acid anhydride group, wherein a weight average molecular weight (Mw) of the resin is from 1,000 to 4,000; a Z average molecular weight (Mz) of the resin is from 2,500 to 10,000; a ratio (Mz/Mw) between the Z average molecular weight and the weight average molecular weight is from 1.5 to 2.5; a Gardner color scale of a 50 mass % toluene solution is 5 or less; a softening point of the resin is 30° C. or more; and an acid value of the resin is from 1 KOHmg/g to 20 KOHmg/g.

A preferred method for producing the modified hydrocarbon resin is a method comprising:

a polymerization step in which a monomer mixture A comprising: 20 mass % to 70 mass % of 1,3-pentadiene, 10 mass % to 35 mass % of a C4-C6 alicyclic monoolefin, 5 mass % to 30 mass % of a C4-C8 acyclic monoolefin, 0 mass % to 1 mass % of an alicyclic diolefin, and 10 mass % to 40 mass % of an aromatic monoolefin, is cationically polymerized at 65° C. or less using, as a polymerization catalyst, a halogenated aluminum (A) and a halogenated hydrocarbon (B) selected from the group consisting of a halogenated hydrocarbon (B1) in which a halogen atom is bound to a tertiary carbon atom and a halogenated hydrocarbon (B2) in which a halogen atom is bound to a carbon atom adjacent to a carbon-carbon unsaturated bond, and a modification step in which a resin obtained by the polymerization step is acid-modified by reaction with a unsaturated carboxylic acid or unsaturated dicarboxylic anhydride.

However, the modified hydrocarbon resin of the present invention is not limited to a resin produced by the preferred method mentioned above.

Hereinafter, (1) a method for producing a raw material resin that is not yet subjected to reaction with a unsaturated carboxylic acid or unsaturated dicarboxylic anhydride (hereinafter the resin may be referred to as a "resin prior to modification") will be described along with the properties of the resin prior to modification. Then, (2) a method for producing a modified hydrocarbon resin that is obtained by use of the resin prior to modification, will be described along with the properties of the modified hydrocarbon resin.

(1) The Method for Producing the Resin Prior to Modification and the Properties of the Resin Prior to Modification The raw materials for the resin prior to modification, are at least 1,3-pentadiene, a C4-C6 alicyclic monoolefin, a C4-C8 acyclic monoolefin, and an aromatic monoolefin.

The content ratio of the 1,3-pentadiene (piperylene) is needed to be from 20 mass % to 70 mass %, with respect to the whole polymerizable component (the monomer mixture A), and it is preferably from 30 mass % to 65 mass %, and more preferably from 35 mass % to 55 mass %. When the content of the 1,3-pentadiene in the polymerizable component is too small, the resulting hot-melt adhesive composition containing the modified hydrocarbon resin (hereinafter, unless otherwise noted, the "hot-melt adhesive composition" means a composition containing the modified hydrocarbon resin of the present invention) obtains poor heat deterioration resistance. On the other hand, when the content of the 1,3-pentadiene in the polymerizable component is too large, the resulting hot-melt adhesive composition obtains a short open time, low adhesion and poor coatability.

For the 1,3-pentadiene, the cis/trans isomer ratio may be a desired ratio and is not particularly limited.

The C4-C6 alicyclic monoolefin is a C4-C6 hydrocarbon compound that contains, in its molecular structure, one ethylenically unsaturated bond and a non-aromatic cyclic structure. As the C4-C6 alicyclic monoolefin, examples include, but are not limited to, cyclobutene, cyclopentene, cyclohexene, methylcyclobutene and methylcyclopentene.

The content ratio of the C4-C6 alicyclic monoolefin is needed to be from 10 mass % to 35 mass % with respect to the whole polymerizable component (the monomer mixture A), and it is preferably from 15 mass % to 30 mass %, and more preferably from 20 mass % to 27.5 mass %. When the content of the C4-C6 alicyclic monoolefin in the polymerizable component is too small, the resulting hot-melt adhesive composition obtains a short open time, low adhesion and poor coatability. On the other hand, when the content of the C4-C6 alicyclic monoolefin in the polymerizable component is too large, the resulting hot-melt adhesive composition obtains poor heat deterioration resistance.

In the C4-C6 alicyclic monoolefin, the ratio of the corresponding compounds may be a desired ratio and is not particularly limited. The C4-C6 alicyclic monoolefin preferably contains at least cyclopentene. More preferably, the ratio of the cyclopentene in the C4-C6 alicyclic monoolefin is 50 mass % or more.

The C4-C8 acyclic monoolefin is a C4-C8 chain hydrocarbon compound that contains, in its molecular structure, one ethylenically unsaturated bond and no cyclic structure. As the C4-C8 acyclic monoolefin, examples include, but are not limited to, butenes such as 1-butene, 2-butene and isobutylene (2-methylpropene); pentenes such as 1-pentene, 2-pentene, 2-methyl-1-butene, 3-methyl-1-butene and 2-methyl-2-butene; hexenes such as 1-hexene, 2-hexene and 2-methyl-1-pentene; heptenes such as 1-heptene, 2-heptene and 2-methyl-1-hexene; and octenes such as 1-octene, 2-octene, 2-methyl-1-heptene, diisobutylene (2,4,4-trimethyl-1-pentene and 2,4,4-trimethyl-1-pentene).

The content ratio of the C4-C8 acyclic monoolefin is needed to be from 5 mass % to 30 mass % with respect to the whole polymerizable component (the monomer mixture A), and it is preferably from 5 mass % to 25 mass %, and more preferably from 5 mass % to 20 mass %. When the content of the C4-C8 acyclic monoolefin in the polymerizable component is too small, the resulting hot-melt adhesive composition obtains a short open time, low adhesion and poor coatability. On the other hand, when the content of the C4-C8 acyclic monoolefin in the polymerizable component is too large, the resulting hot-melt adhesive composition obtains poor heat deterioration resistance.

In the C4-C8 acyclic monoolefin, the ratio of the corresponding compounds (including the isomer) may be a desired ratio and is not particularly limited. The C4-C8 acyclic monoolefin preferably contains at least one selected from the group consisting of 2-methyl-2-butene, isobutylene and diisobutylene. More preferably, the ratio of the total amount of the 2-methyl-2-butene, isobutylene and diisobutylene in the C4-C6 alicyclic monoolefin, is 50 mass % or more.

The aromatic monoolefin is an aromatic compound that contains one ethylenically unsaturated bond in its molecular structure. As the aromatic monoolefin, examples include, but are not limited to, styrene, α-methylstyrene, vinyltoluene, indene and coumarone.

The content ratio of the aromatic monoolefin is needed to be from 10 mass % to 40 mass % with respect to the whole polymerizable component (the monomer mixture A), and it is preferably from 12 mass % to 30 mass %, and more preferably from 13 mass % to 25 mass %. When the content of the aromatic monoolefin in the polymerizable component is too small, compatibility with the base polymer deteriorates and makes the hot-melt adhesive composition turbid and low in peel adhesion. On the other hand, when the content of the aromatic monoolefin in the polymerizable component is too large, the adhesion strength of the hot-melt adhesive composition is decreased by a deterioration in compatibility with the base polymer; moreover, odor derived from the aromatic monoolefin is intensified and causes a deterioration in odor.

In the aromatic monoolefin, the ratio of the corresponding compounds (including the isomer) may be a desired ratio and is not particularly limited. The aromatic monoolefin preferably contains at least styrene. More preferably, the ratio of the styrene in the aromatic monoolefin is 50 mass % or more.

The resin prior to modification may contain an alicyclic diolefin as a raw material therefor. The alicyclic diolefin is a hydrocarbon compound that contains, in its molecular structure, two or more ethylenically unsaturated bonds and a non-aromatic cyclic structure. As the alicyclic diolefin, examples include, but are not limited to, cyclopentadiene, multimers of cyclopentadiene (e.g., dicyclopentadiene), methylcyclopentadiene, and multimers of methylcyclopentadiene.

However, the ratio of the alicyclic diolefin in the polymerizable component (the monomer mixture A) is needed to be equal to or less than a specific ratio. In particular, the ratio of the alicyclic diolefin in the whole polymerizable component (the monomer mixture A) is needed to be from 0 mass % to 1 mass %, and it is preferably from 0 mass % to 0.8 mass %, and more preferably from 0 mass % to 0.5 mass %. When the content of the alicyclic diolefin in the polymerizable component A is too large, the resulting hot-melt adhesive composition obtains a short open time, low adhesion and poor coat ability.

The polymerizable component (the monomer mixture A) may contain a monomer other than the 1,3-pentadiene, the C4-C6 alicyclic monoolefin, the C4-C8 acyclic monoolefin, the alicyclic diolefin and the aromatic monoolefin. The other monomer is not particularly limited, as long as it is a compound which is other than the above-described monomers and which has addition polymerization capability that allows addition copolymerization with 1,3-pentadiene, etc. As the other monomer, examples include, but are not limited to, C4-C6 unsaturated hydrocarbons other than 1,3-pentadiene, such as 1,3-butadiene, 1,2-butadiene, isoprene, 1,3-hexadiene and 1,4-pentadiene; C7 or higher alicyclic monoolefins such as cycloheptene; and acyclic monoolefins other than C4-C8 acyclic monoolefins, such as ethylene, propylene and nonene.

However, the ratio of the other monomer in the polymerizable component (the monomer mixture A) is needed to be equal to or less than a specific ratio. In particular, the ratio of the other monomer in the whole polymerizable component (the monomer mixture A) is needed to be from 0 mass % to 30 mass %, preferably from 0 mass % to 25 mass %, and more preferably from 0 mass % to 20 mass %. When the content of the monomer in the polymerizable component is too large, the resulting hot-melt adhesive composition obtains a short open time and low adhesion.

The method for producing the resin prior to modification is not particularly limited, as long as the polymerizable component (the monomer mixture A) of the above-mentioned composition is preferably subjected to addition polymerization. For example, the resin prior to modification can be obtained by addition polymerization using a Friedel-Crafts type cationic polymerization catalyst. A preferred method for producing the resin prior to modification is, for example, such a polymerization method that the halogenated aluminum (A) and the halogenated hydrocarbon (B) selected from the group consisting of the halogenated hydrocarbon (B1) in which a halogen atom is bound to a tertiary carbon atom and the halogenated hydrocarbon (B2) in which a halogen atom is bound to a carbon atom adjacent to a carbon-carbon unsaturated bond, are used in combination as a polymerization catalyst. The halogenated aluminum (A), the halogenated hydrocarbon (B), the halogenated hydrocarbon (B1) and the halogenated hydrocarbon (B2) will be described blow.

As the halogenated aluminum (A), examples include, but are not limited to, aluminum chloride ($AlCl_3$) and aluminum bromide ($AlBr_3$). Of them, aluminum chloride is preferably used from the viewpoint of versatility.

The amount of the halogenated aluminum (A) used is not particularly limited. It is preferably from 0.05 parts to 10 parts by mass, and more preferably from 0.1 part to 5 parts by mass, with respect to 100 parts by mass of the polymerizable component (the monomer mixture A).

By using the halogenated hydrocarbon (B) in combination with the halogenated aluminum (A), the activity of the polymerization catalyst becomes very excellent.

As the halogenated hydrocarbon (B1) in which a halogen atom is bound to a tertiary carbon atom, examples include, but are not limited to, t-butyl chloride, t-butyl bromide, 2-chloro-2-methylbutane, and triphenylmethyl chloride. Of them, t-butyl chloride is particularly preferably used since it has excellent balance between activity and ease of handling.

For the halogenated hydrocarbon (B2) in which a halogen atom is bound to a carbon atom adjacent to a carbon-carbon unsaturated bond, as the unsaturated bond, examples include, but are not limited to, a carbon-carbon double bond, a carbon-carbon triple bond, and a carbon-carbon conjugated double bond contained in an aromatic ring, etc. As such a compound, examples include, but are not limited to, benzyl chloride, benzyl bromide, (1-chloroethyl)benzene, allyl chloride, 3-chloro-1-propyne, 3-chloro-1-butene, 3-chloro-1-butyne, and cinnamyl chloride. Of them, benzyl chloride is preferably used since it has excellent balance between activity and ease of handling.

These examples provided as the halogenated hydrocarbon (B) may be used alone or in combination of two or more kinds.

The amount of the halogenated hydrocarbon (B) used is preferably in a range of from 0.05 to 50, more preferably from 0.1 to 10, at a molar ratio with respect to the halogenated aluminum (A).

In the polymerization reaction, the order of adding the components of the monomer mixture or polymerization catalyst to a polymerization reactor, is not particularly limited and may be a desired order. From the viewpoint of controlling the polymerization reaction successfully, and obtaining a modified hydrocarbon resin with better hue, it is preferable to initiate a polymerization reaction by adding part of the components of the monomer mixture and polymerization catalyst to the polymerization reactor, and then add the rest of the polymerization catalyst to the polymerization reactor.

In the production of the resin prior to modification, it is preferable that first, the halogenated aluminum (A) and the alicyclic monoolefin are mixed together. This is because, by bringing the halogenated aluminum (A) and the alicyclic monoolefin into contact with each other, gel production can be prevented and the resin prior to modification with low Gardner color can be obtained.

The amount of the alicyclic monoolefin mixed with the halogenated aluminum (A) is preferably at least 5 times (mass ratio) the amount of the halogenated aluminum (A). If the amount of the alicyclic monoolefin is too small, the prevention of gel production and the effect of improving hue may be insufficient. The mass ratio of the alicyclic monoolefin to the halogenated aluminum (A) is preferably from 5:1 to 120:1, more preferably from 10:1 to 100:1, and still more preferably from 15:1 to 80:1. If the alicyclic monoolefin used is much larger than the ratio, a decrease in catalytic activity occurs and may lead to insufficient polymerization.

In the mixing of the halogenated aluminum (A) and the alicyclic monoolefin, the order of adding them is not particularly limited. For example, the halogenated aluminum (A) may be added to the alicyclic monoolefin, or in reverse, the alicyclic monoolefin may be added to the halogenated aluminum (A). Since the mixing is generally associated with heat generation, an appropriate diluent can be used. As the diluent, for example, a solvent described below can be used.

It is preferable that after the mixture M of the halogenated aluminum (A) and the alicyclic monoolefin is prepared in the manner described above, the mixture M is mixed with the mixture a containing at least the 1,3-pentadiene, the acyclic monoolefin and the aromatic monoolefin. The mixture a may contain an alicyclic diolefin.

The method for preparing the mixture a is not particularly limited. The target mixture a may be obtained by mixing pure compounds, or the target mixture a may be obtained by using a mixture containing a target monomer derived from, for example, a naphtha degradation product fraction. For example, to add 1,3-pentadiene, etc., to the mixture a, a C5 fraction left after the extraction of isoprene and cyclopentadiene (including its multimer) can be preferably used.

It is preferable that the mixture a and the mixture M are further mixed with the halogenated hydrocarbon (B). The order of adding the three components is not particularly limited.

From the viewpoint of successfully controlling the polymerization reaction, it is preferable to initiate the polymerization reaction by adding a solvent to the polymerization reaction system. The type of the solvent is not particularly limited, as long as the polymerization reaction is not inhibited. The solvent is preferably a saturated aliphatic hydrocarbon or an aromatic hydrocarbon. As the saturated aliphatic hydrocarbon used as the solvent, examples include, but are not limited to, C5-C10 chain saturated aliphatic hydrocarbons such as n-pentane, n-hexane, 2-methylpentane, 3-methylpentane, n-heptane, 2-methylhexane, 3-methylhexane, 3-ethylpentane, 2,2-dimethylpentane, 2,3-dimethylpentane, 2,4-dimethylpentane, 3,3-dimethylpentane, 2,2,3-trimethylbutane and 2,2,4-trimethylpentane, and C5-C10 cyclic saturated aliphatic hydrocarbons such as cyclopentane, cyclohexane, cycloheptane and cyclooctane. As the aromatic hydrocarbon used as the solvent, examples include, but are not limited to, C6 to C10 aromatic hydrocarbons such as benzene, toluene and xylene. These solvents may be used alone or in combination of two or more kinds as a mixed solvent. The amount of the solvent used is not particularly limited. It is preferably from 10 parts to 1,000 parts by mass, and more preferably from 50 parts to 500 parts by mass, with respect to 100 parts by mass of the polymerizable component (the monomer mixture A). For example, a mixture of an addition-polymerizable component and a non-addition-polymerizable component, such as the mixture of the cyclopentane and cyclopentene derived from the C5 fraction, can be added to the polymerization reaction system to use the addition-polymerizable component as a component of the monomer mixture and the non-addition-polymerizable component as the solvent.

In the polymerization reaction, the polymerization temperature is not particularly limited. It is preferably in a range of from −20° C. to 100° C., and preferably in a range of from 0° C. to 65° C. When the polymerization temperature is too low, polymerization activity decreases and may reduce productivity. When the polymerization temperature is too high, the resin prior to modification may obtain poor hue. The polymerization reaction may be initiated under the atmospheric pressure or under a pressure.

The polymerization reaction time can be appropriately selected. It is generally from 10 minutes to 12 hours, and preferably from 30 minutes to 6 hours.

The polymerization reaction can be stopped by adding a polymerization inhibitor such as methanol, sodium hydroxide aqueous solution or ammonia aqueous solution to the polymerization reaction system when a desired polymerization conversion rate is obtained. Catalyst residues insoluble in the solvent, are produced when the polymerization catalyst is inactivated by adding the polymerization inhibitor. The catalyst residues may be removed by filtration, etc. After the polymerization reaction is stopped, unreacted monomers and the solvent are removed. Moreover, low-molecular-weight oligomer components are removed by steam distillation or the like and cooled down, whereby the resin prior to modification can be obtained, which is in a solid form.

(2) The Method for Producing the Modified Hydrocarbon Resin and its Properties

The resin prior to modification is treated with a unsaturated carboxylic acid or unsaturated dicarboxylic anhydride, thereby introducing the carboxyl group or acid anhydride group in the resin prior to modification and producing the modified hydrocarbon resin, therefore. That is, the resin obtained above is acid-modified by reaction (acid modification reaction) with a unsaturated carboxylic acid or unsaturated dicarboxylic anhydride, thereby obtaining the desired modified hydrocarbon resin.

As the unsaturated carboxylic acid used for the introduction of the carboxyl group, examples include, but are not limited to, C8 or lower ethylenically unsaturated carboxylic acids such as acrylic acid, methacrylic acid, crotonic acid, maleic acid, fumaric acid, itaconic acid and citraconic acid, and a Diels-Alder adduct of a conjugated diene (e.g., 3,6-endomethylene-1,2,3,6-tetrahydrophthalic acid) and a C8 or lower α,β-unsaturated dicarboxylic acid.

As the unsaturated dicarboxylic anhydride used for the introduction of the acid anhydride group, examples include, but are not limited to, C8 or lower α,β-unsaturated dicarboxylic anhydrides such as maleic anhydride, itaconic anhydride and citraconic anhydride, and a Diels-Alder adduct of a conjugated diene (e.g., 3,6-endomethylene-1,2,3,6-tetrahydrophthalic anhydride) and a C8 or lower α,β-unsaturated dicarboxylic anhydride.

From the viewpoint of ease of reaction and economy, a C8 or lower α,β-unsaturated aliphatic dicarboxylic anhydride is preferred, and maleic anhydride is particularly preferred. These acid modifiers can be used alone or in combination of two or more kinds.

The above-described acid modification reaction is generally initiated at a temperature of 50° C. to 300° C. for 5 minutes to 20 hours. As needed, a diluent, an anti-gelling agent and a reaction promoter may be present. Considering the hue of the thus-obtained resin, the amount of the unsaturated carboxylic acid or unsaturated dicarboxylic anhydride used as the acid modifier in this reaction is generally from 0.01 part to 10 parts by mass, and preferably from 0.05 part to 5 parts by mass, with respect to 100 parts by mass of the resin prior to modification.

The weight average molecular weight (Mw) of the thus-obtained resin according to the present invention, is from 1,000 to 4,000, preferably from 1,500 to 3,800, and more preferably from 1,800 to 3,500. When the weight average molecular weight (Mw) of the modified hydrocarbon resin is too small, the resulting hot-melt adhesive composition obtains poor heat deterioration resistance. On the other hand, when the weight average molecular weight (Mw) is too large, the resulting hot-melt adhesive composition obtains a short open time, low adhesion and poor coatability.

The Z average molecular weight (Mz) of the modified hydrocarbon resin according to the present invention is from 2,500 to 10,000, preferably from 4,000 to 8,000, and more preferably from 5,000 to 7,000. When the Z average molecular weight (Mz) of the modified hydrocarbon resin is too small, the resulting hot-melt adhesive composition obtains poor heat deterioration resistance or high-temperature adhesion performance. On the other hand, when the Z average molecular weight (Mz) is too large, the resulting hot-melt adhesive composition obtains a short open time, low adhesion and poor coatability.

In the present invention, the weight average molecular weight (Mw) and Z average molecular weight (Mz) of the hydrocarbon resin are polystyrene equivalents obtained by gel permeation chromatography measurement using tetrahydrofuran as a solvent.

The ratio (Mz/Mw) between the Z average molecular weight and weight average molecular weight of the modified hydrocarbon resin according to the present invention, is from 1.5 to 2.5, preferably from 1.6 to 2.4, and more preferably from 1.8 to 2.35. When the ratio is too small, the resulting hot-melt adhesive composition obtains poor heat deterioration resistance. When the ratio is too large, the resulting hot-melt adhesive composition obtains a short open time and low adhesion.

The Gardner color scale of the 50 mass % toluene solution of the modified hydrocarbon resin according to the present invention, is 5 or less, and preferably 4 or less. When this value is too large, the hydrocarbon resin is poor in hue.

In the present invention, the Gardner color scale can be measured as follows, for example. First, a 50 mass % toluene solution of a sample modified hydrocarbon resin is prepared, and the Gardner color scale of the solution is measured in accordance with JIS K 0071-2.

The softening point of the modified hydrocarbon resin according to the present invention, is 30° C. or more, preferably from 50° C. to 125° C., and more preferably from 60° C. to 115° C. When the softening point of the modified hydrocarbon resin is too low, the resulting hot-melt adhesive composition obtains poor heat deterioration resistance. When the softening point is too high, the resulting hot-melt adhesive composition obtains a short open time, low adhesion and poor coatability.

In the present invention, the softening point is a value measured for the modified hydrocarbon resin in accordance with JIS K 6863, for example.

The acid value of the modified hydrocarbon resin according to the present invention, is from 1 KOHmg/g to 20 KOHmg/g, preferably from 3 KOHmg/g to 17 KOHmg/g, and more preferably from 5 KOHmg/g to 15 KOHmg/g. When the acid value is too low or too the hot-melt adhesive composition is poor in peel adhesion.

In the present invention, the acid value is a value measured for the modified hydrocarbon resin in accordance with JIS K 0070, for example.

In the present invention, the Gardner color scale, softening point and acid value of the modified hydrocarbon resin can be readily controlled to be in the desired ranges by preparing the modified hydrocarbon resin in accordance with the above-described composition and production method.

As needed, the modified hydrocarbon resin can be further modified for use. A modifier and a modification reaction mode are used for the modification. As the modifier and the modification reaction mode, examples include, but are not limited to, esterification by monovalent alcohol such as methanol, ethanol, propanol, butanol or allyl alcohol, or polyvalent alcohol such as ethylene glycol, propylene glycol, butanediol or glycerin; amidation by amine such as methylamine, ethylamine, diethylamine, triethylamine, ethanolamine, ethylenediamine, propylenediamine, diethylenetriamine or tetraethylenepentamine, or ammonia; and salt formation by alkaline metal or alkaline earth metal such as sodium, potassium, calcium or magnesium.

The modified hydrocarbon resin of the present invention obtained as described above, is excellent in hue even though the resin is not hydrogenated. Therefore, thanks to the characteristics, the modified hydrocarbon resin is applicable to various kinds of applications to which conventional modified hydrocarbon resin can be applied. Especially, the modified hydrocarbon resin of the present invention is preferably used as a tackifier resin for an adhesive, and it is particularly preferably used as a tackifier resin for a hot-melt adhesive composition.

2. Hot-Melt Adhesive Composition

The hot-melt adhesive composition according to the present invention comprises the modified hydrocarbon resin and an ethylene-vinyl acetate copolymer. In the hot-melt adhesive composition of the present invention, the ethylene-vinyl acetate copolymer is used as a base polymer.

The vinyl acetate monomer unit content of the ethylene-vinyl acetate copolymer is preferably from 10 mass % to 50 mass %, more preferably from 15 mass % to 40 mass %, and still more preferably from 15 mass % to 35 mass %. As the ethylene-vinyl acetate copolymer, an ethylene-vinyl acetate copolymer with a melt flow rate of 1 g/10 min to 500 g/10 min can be preferably used.

The ethylene-vinyl acetate copolymer as described above is available as a commercial product. For example, EVAF-LEX EV220 (product name, manufactured by DuPont-Mitsui Polychemicals Co., Ltd.) or VA900 (product name, manufactured by Lotte Chemical Corporation) can be preferably used.

In the hot-melt adhesive composition of the present invention, the ratio between the ethylene-vinyl acetate copolymer and the modified hydrocarbon resin is not particularly limited. With respect to 100 parts by mass of the ethylene-vinyl acetate copolymer, the modified hydrocarbon resin is preferably from 50 parts to 500 parts by mass, and more preferably from 80 parts to 200 parts by mass. When the ratio of the modified hydrocarbon resin is in this range, the adhesion of the hot-melt adhesive composition of the present invention becomes very excellent.

The hot-melt adhesive composition of the present invention may be composed of the modified hydrocarbon resin and the ethylene-vinyl acetate copolymer only, or it may further contain other components. As the other components that may be contained in the hot-melt adhesive composition of the present invention, examples include, but are not limited to, a wax, an antioxidant, a tackifier resin other than the modified hydrocarbon resin of the present invention, a polymer other than those described above, and other additives such as a thermal stabilizer, an ultraviolet absorber and a filler.

The hot-melt adhesive composition of the present invention is preferably a solvent-free composition that does not contain a solvent.

The wax that may be added to the hot-melt adhesive composition of the present invention, is not particularly limited. As the wax, examples include, but are not limited to, polyethylene wax, ethylene-vinyl acetate copolymer wax, oxidized polyethylene wax, paraffin wax, microcrystalline wax, Fischer-Tropsh wax, oxidized Fischer-Tropsh wax, hydrogenated castor oil wax, polypropylene wax, by-product polyethylene wax, and hydroxystearamid wax. These waxes may be used alone or in combination of two or more kinds. The content of the wax in the hot-melt adhesive composition is not particularly limited. It is preferably from 10 parts to 200 parts by mass, and more preferably from 20 parts to 100 parts by mass, with respect to 100 parts by mass of the ethylene-vinyl acetate copolymer. When the content of the wax is in this range, the resulting hot-melt adhesive composition obtains particularly excellent coatability.

The antioxidant that may be added to the hot-melt adhesive composition of the present invention, is not particularly limited. As the antioxidant, examples include, but are not limited to, hindered phenol-based compounds such as pentaerythritol tetrakis[3-(3,5-di-t-butyl-4-hydroxyphenyl)propionate], octadecyl-3-(3,5-di-t-butyl-4-hydroxyphenyl)propionate, 2,6-di-t-butyl-p-cresol, and di-t-butyl-4-methyl phenol; thiodicarboxylate esters such as dilaurylthiopropionate; and phosphites such as tris(nonylphenyl)phosphite. The amount of the antioxidant used is not particularly limited. It is generally 10 parts by mass or less, and preferably from 0.5 parts to 5 parts by mass, with respect to 100 parts by mass of the ethylene-vinyl acetate copolymer. These antioxidants may be used alone or in combination of two or more kinds.

The softening agent that may be added to the hot-melt adhesive composition of the present invention, is not particularly limited. As the softening agent, examples include, but are not limited to, process oils such as aromatic, paraffin-based and naphthene-based process oils, and liquid polymers such as polybutene and polyisobutylene. These softening agents may be used alone or in combination of two or more kinds.

As the tackifier resin that may be added to the hot-melt adhesive composition of the present invention, which is other than the above-mentioned modified hydrocarbon resin, a conventionally known tackifier resin can be used. As the resin, examples include, but are not limited to, rosin; modified rosins such as disproportionated rosin and dimeric rosin; esters from polyalcohols (e.g., glycol, glycerin, pentaerythritol) with rosins or modified rosins; terpene-based resins; aliphatic, aromatic, alicyclic, and aliphatic-aromatic copolymer-based hydrocarbon resins and hydrides thereof; phenol resin; and coumarone-indene resin. These tackifier resins may be used alone or in combination of two or more kinds.

As the polymer that may be added to the hot-melt adhesive composition of the present invention, which is other than those described above, examples include, but are not limited to, conjugated diene homopolymers such as polybutadiene and polyisoprene; aromatic vinyl-conjugated diene random copolymers such as a (styrene-butadiene) random copolymer and a (styrene-isoprene) random copolymer; aromatic vinyl-conjugated diene block copolymers such as a (styrene-butadiene) block copolymer and a (styrene-isoprene) block copolymer; aromatic vinyl homopolymers such as polystyrene; and polymers that is elastic at room temperature (23° C.) such as an isobutylene-based polymer, an acryl-based polymer, an ester-based polymer, an ether-based polymer, a urethane-based polymer and a polyvinyl chloride.

In the hot-melt adhesive composition of the present invention, the content of the polymers is preferably 20 mass % or less, and more preferably 10 mass % or less, with respect to the total amount of the hot-melt adhesive composition.

In the production of the hot-melt adhesive composition of the present invention, the method for mixing the modified hydrocarbon resin, the ethylene-vinyl acetate copolymer and the other components added as needed, is not particularly limited. As the mixing method, examples include, but are not limited to, a method of dissolving and uniformly mixing the components in the solvent and then removing the solvent by heating or the like, and a method of melting and mixing the components by a kneader. From the viewpoint of mixing the components more efficiently, the melting and mixing method is preferred among these methods. In the mixing and melting, the temperature is not particularly limited, and it is generally in a range of from 100° C. to 200° C.

Since the hot-melt adhesive composition of the present invention contains the modified hydrocarbon resin as a tackifier resin, it is a composition with low odor, low Gardner color and high peel adhesion. Therefore, the hot-melt adhesive composition of the present invention can be used to attach various kinds of components and allows energy-saving adhesion with high productivity and high adhesion retaining force.

The hot-melt adhesive composition of the present invention is applicable to various kinds of applications, and the applications are not limited. The hot-melt adhesive composition has such characteristics that it shows sufficient adhesion strength even when the amount of the applied composition is small; moreover, it has excellent heat deterioration resistance and is resistant to deterioration when used in a sealing machine, etc. Therefore, the hot-melt adhesive composition of the present invention can be particularly preferably used as an adhesive to seal industrial transportation packaging materials.

EXAMPLES

Hereinafter, the present invention will be described further in detail, with reference to examples and comparative examples. Herein, "part(s)" and "%" are based on mass if not particularly mentioned.

Measurements were carried out by the following methods.
[Weight Average Molecular Weight, Z Average Molecular Weight and Molecular Weight Distribution]

A sample modified hydrocarbon resin was subjected to gel permeation chromatography analysis to obtain a weight average molecular weight (Mw), a Z average molecular weight (Mz) and a molecular weight distribution. The weight average molecular weight (Mw) and the Z average molecular weight (Mz) are standard polystyrene equivalents, and the molecular weight distribution is expressed by the following ratio: Mz/Mw. For the gel permeation chromatography analysis, HLC-8320GPC (product name, manufactured by Tosoh Corporation) was used as a measurement device; three TSK gel Super Multipore HZ columns (product name, manufactured by Tosoh Corporation) were connected and used as a column; tetrahydrofuran was used as a solvent; and the measurement was carried out at 40° C. and a flow rate of 1.0 mL/min.

[Gardner Color Scale of 50 Mass % Toluene Solution]

A 50 mass % toluene solution of a sample modified hydrocarbon resin was prepared. The Gardner color scale of the solution was measured in accordance with JIS K 0071-2. The smaller the value, the better the hue.

[Softening Point (° C.)]

A sample modified hydrocarbon resin was measured in accordance with JIS K 6863.

[Acid Value (KOHmg/g)]

A sample modified hydrocarbon resin was measured in accordance with JIS K 0070.

[Melt Viscosity (mPa·s)]

A sample hot-melt adhesive composition was melted by heating. The melt viscosity (mPa·s) at 180° C. of the composition was measured by a Brookfield Thermosel viscometer, using a rotor (No. 27). The smaller the value, the better the coatability.

[Cloud Point (° C.)]

A sample hot-melt adhesive composition was put in a test tube. A thermometer was inserted into the tube until it reached the bottom of the tube. Then, the tube was heated to 180° C. to melt the composition. Then, the tube was cooled down, and the temperature at which the bottom of the test tube was clouded, was recorded as a cloud point. The smaller the value, the better the compatibility between the components constituting the hot-melt adhesive composition. As a result, the hot-melt adhesive composition obtains a long open time and high adhesion.

[Peel Adhesion (N/25 mm)]

In accordance with PSTC-1 (a test method for peel adhesion at 180° angle prescribed by the pressure sensitive adhesive tape committee in the U.S.), peel adhesion was measured at 23° C. using an aluminum substrate as an adherend. The higher the value, the better the peel adhesion.

[Odor Evaluation Test]

The sensory test of the hot-melt adhesive composition was carried out in accordance with the odor intensity indication method in the olfactory measurement method prescribed by the odor control association of Japan.

In particular, first, 10 g of the hot-melt adhesive composition that the particle size was about 10 mm×5 mm×5 mm, was put in a 120 mL heat-resistant container. The container was covered with an aluminum foil. Then, the heat-resistant container containing the hot-melt adhesive composition was placed in an oven and heated under the condition of a temperature of 150° C. and a heating time of 30 minutes. After the heating, the odor of the hot-melt adhesive composition was checked.

The odor was checked by six panel members who are not familiar with the odor of petroleum resin (that is, members who are not exposed to the odor of petroleum resin in daily life). In this test, to prevent the members from olfactory fatigue, the following method was employed: the six panel members were divided into two groups (three members each) and the odor was checked by the groups, alternately. Samples subject to the odor evaluation were checked in a random order.

0: No odor
1: Slight odor
2: Obvious odor
3: Strong odor
4: Very strong odor

The result of the sensory test was obtained by excluding the highest and lowest values from the values scored by the six panel members and averaging the remaining four values. The smaller the value of the sensory test, the better.

Example 1

First, a mixture of 56.1 parts of cyclopentane and 24.6 parts of cyclopentene was put in a polymerization reactor. The temperature of the reactor was increased to 60° C. Then, 0.6 part of aluminum chloride was added thereto, thereby obtaining a mixture $M_1$. Next, 0.2 part of t-butyl chloride and a mixture al, which is a mixture of 41.4 parts of 1,3-pentadiene, 8.4 parts of isobutylene, 22.0 parts of styrene, 0.5 part of C4-C6 unsaturated hydrocarbon and 7.2 parts of C4-C6 saturated hydrocarbon, were each continuously added to the polymerization reactor containing the mixture $M_1$ through different lines for 60 minutes, with keeping the temperature of the reactor at 60° C., for polymerization. Then, the sodium hydroxide aqueous solution was added to the polymerization reactor to stop the polymerization reaction. Table 1 shows the types and amounts of the components in the polymerization reactor during the polymerization reaction. A precipitate produced by stopping the polymerization was removed by filtration. Then, a polymer solution thus obtained was put in a distillation still and heated under a nitrogen atmosphere for removal of the polymerization solvent and unreacted monomers.

Next, with injecting saturated water vapor at 240° C. or more, low-molecular-weight oligomer components were distilled away.

To 100 parts of the thus-obtained resin in a melted state, 3.1 parts of maleic anhydride was added. The resin underwent an addition reaction at 230° C. for one hour. Then, as an antioxidant, 0.2 part of pentaerythritol tetrakis[3-(3,5-di-t-butyl-4-hydroxyphenyl)propionate] (product name: Irganox 1010, manufactured by: BASF) was added to and mixed with the resin. Then, the melted resin was taken out from the distillation still and cooled down to room temperature, thereby obtaining a modified hydrocarbon resin of Example 1. For the thus-obtained modified hydrocarbon resin of Example 1, the weight average molecular weight, Z average molecular weight, molecular weight distribution, Gardner color scale, softening point and acid value were measured. The measurement results are shown in Table 1.

Examples 2 to 4 and Comparative Examples 1 to 4

Modified hydrocarbon resins of Examples 2 to 4 and Comparative Examples 1 to 4 were obtained in the same manner as Example 1, except that the types and amounts of the components added to the polymerization reactor and the polymerization temperature were changed as shown in the following Table 1. Diisobutylene, dicyclopentadiene, toluene and benzyl chloride shown in Table 1, which are not described in Example 1, were mixed with the t-butyl chloride in combination with the 1,3-pentadiene and so on and used for polymerization.

The thus-obtained modified hydrocarbon resins of Examples 2 to 4 and Comparative Examples 1 to 4 were measured in the same manner as Example 1. The measurement results are shown in the following Table 1.

The following Table 2 shows the composition ratio of the polymerizable component (the monomer mixture A) in the raw material mixture.

TABLE 1

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Raw material mixture composition (part) | | 1,3-Pentadiene | 41.4 | 38.3 | 45.4 | 46.8 | 41.2 | 44.2 | 55.5 | 38.0 |
| | C4-C6 alicyclic monoolefin | Cyclopentene | 24.6 | 26.7 | 25.9 | 23.6 | 24.8 | 29.1 | 22.4 | 22.9 |
| | C4-C8 acyclic monoolefin | Isobutylene | 8.4 | 9.5 | 12.3 | 4.5 | 5.7 | 19.0 | 5.3 | 8.3 |
| | | Diisobutylene | — | 1.6 | — | 0.7 | 0.9 | — | — | — |
| | Alicyclic dolefin | Dicyclopentadiene | — | — | 0.2 | 0.1 | — | — | — | 0.3 |
| | Aromatic monoolefin | Styrene | 22.0 | 21.8 | 13.4 | 22.1 | 26.9 | 6.5 | 14.5 | 26.9 |
| | Other monomer | C4-C6 unsaturated hydrocarbon | 0.5 | 0.5 | 0.6 | 0.6 | 0.5 | 0.6 | 0.7 | 0.5 |
| | Acid modifier | Maleic anhydride | 3.1 | 1.6 | 2.2 | 1.6 | — | 0.6 | 1.6 | 3.1 |
| Total (parts) | | | 100.0 | 100.0 | 100.0 | 100.0 | 100.0 | 100.0 | 100.0 | 100.0 |
| Solvent composition (part) | | C4-C6 saturated hydrocarbon | 7.2 | 8.9 | 7.3 | 5.8 | 7.4 | 9.3 | 3.8 | 6.8 |
| | | Cyclopentane | 56.1 | 50.9 | 56.7 | 45.1 | 57.5 | 71.9 | 40.2 | 62.4 |
| | | Toluene | — | — | — | — | — | — | 3.4 | — |
| Polymerization catalyst composition (part) | | Aluminum chloride | 0.6 | 0.6 | 0.5 | 0.5 | 0.6 | 0.9 | 0.6 | 1.3 |
| | | t-Butyl chloride | 0.2 | — | 0.3 | 0.2 | 0.3 | 0.5 | — | — |
| | | Benzyl chloride | — | 0.1 | — | — | — | — | 0.3 | — |
| Polymerization temperature (° C.) | | | 60 | 60 | 60 | 55 | 60 | 60 | 60 | 70 |
| Modified hydrocarbon resin properties | Weight average molecular weight (Mw) | | 2400 | 2500 | 2600 | 3200 | 2700 | 1900 | 4500 | 3300 |
| | Z average molecular weight (Mz) | | 5400 | 5800 | 5200 | 6800 | 6000 | 4300 | 11000 | 7000 |
| | Molecular weight distribution (Mz/Mw) | | 2.25 | 2.32 | 2.00 | 2.13 | 2.22 | 2.26 | 2.44 | 2.12 |
| | Gardner color scale | | 4 | 2.5 | 3.5 | 2.5 | 1.5 | 4 | 3.5 | 9 |
| | Softening point (° C.) | | 95 | 92 | 93 | 102 | 96 | 96 | 106 | 93 |
| | Acid value (KOH mg/g) | | 10 | 5 | 7 | 5 | 0 | 2 | 5 | 10 |

TABLE 2

| | | | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| Monomer mixture A composition (part) | | 1,3-Pentadiene | 42.7 | 38.9 | 46.4 | 47.6 | 41.2 | 44.5 | 56.4 | 39.2 |
| | C4-C6 alicyclic monoolefin | Cyclopentene | 25.4 | 27.1 | 26.5 | 24.0 | 24.8 | 29.3 | 22.8 | 23.6 |
| | C4-C8 acyclic monoolefin | Isobutylene | 8.7 | 9.7 | 12.6 | 4.6 | 5.7 | 19.1 | 5.4 | 8.6 |
| | | Diisobutylene | — | 1.6 | — | 0.7 | 0.9 | — | — | — |
| | Alicyclic dolefin | Dicyclopentadiene | — | — | 0.2 | 0.1 | — | — | — | 0.3 |
| | Aromatic monoolefin | Styrene | 22.7 | 22.2 | 13.7 | 22.5 | 26.9 | 6.5 | 14.7 | 27.8 |
| | Other monomer | C4-C6 unsaturated hydrocarbon | 0.5 | 0.5 | 0.6 | 0.6 | 0.5 | 0.6 | 0.7 | 0.5 |
| Total (part) | | | 100.0 | 100.0 | 100.0 | 100.0 | 100.0 | 100.0 | 100.0 | 100.0 |

Example 5

First, 50 parts of the modified hydrocarbon resin of Example 1, 40 parts of an ethylene-vinyl acetate copolymer resin (product name: EVAFLEX EV220, manufactured by: DuPont-Mitsui Polychemicals Co., Ltd.), 10 parts of paraffin wax (melting point: 63° C.) and 1.25 parts of an antioxidant (product name: Irganox 1010, manufactured by: BASF) were mixed and kneaded at 180° C. for one hour, thereby obtaining a hot-melt adhesive composition of Example 5. For the hot-melt adhesive composition of Example 5, the melt viscosity, cloud point and peel adhesion were measured. Also, the composition underwent the odor evaluation test. The measurement and test results are shown in Table 3.

Examples 6 to 8 and Comparative Examples 5 to 8

Hot-melt adhesive compositions of Examples 6 to 8 and Comparative Examples 5 to 8 were obtained in the same manner as Example 5, except that the type of the hydrocarbon resin used was changed from the hydrocarbon resin of Example 1 to, as shown in Table 3, the hydrocarbon resins of Examples 2 to 4 and Comparative Examples 1 to 4. The thus-obtained hot-melt adhesive compositions of Examples 6 to 8 and Comparative Examples to 8 underwent the same measurements and test as Example 5. The measurement and test results are shown in the following Table 3.

TABLE 3

| | Example 5 | Example 6 | Example 7 | Example 8 | Comparative Example 5 | Comparative Example 6 | Comparative Example 7 | Comparative Example 8 |
|---|---|---|---|---|---|---|---|---|
| Modified hydrocarbon resin used | Example 1 | Example 2 | Example 3 | Example 4 | Comparative Example 1 | Comparative Example 2 | Comparative Example 3 | Comparative Example 4 |
| Melt viscosity (mPa*s) | 2550 | 2500 | 2800 | 2500 | 2250 | 2800 | 4200 | 2500 |
| Cloud point (° C.) | 77 | 76 | 77 | 78 | >160 | 85 | >120 | 77 |
| Peel adhesion (N/25 mm) | 15.1 | 12.3 | 13.1 | 16.2 | 8.1 | 9.1 | 8.5 | 15.1 |
| Odor evaluation | 2 | 2 | 2 | 2 | 2 | 2 | 4 | 4 |

The following facts are clear from Tables 1 and 3.

First, for the hot-melt adhesive composition of Comparative Example 5, the cloud point is more than 160° C. and high, and the peel adhesion is low (8.1 N/25 mm). This is because the acid value of the modified hydrocarbon resin of Comparative Example 1, which is a raw material, is too low (0 KOHmg/g).

Next, for the hot-melt adhesive composition of Comparative Example 6, the peel adhesion is low (9.1 N/25 mm). This is because the amount of the styrene monomer unit contained in the modified hydrocarbon resin of Comparative Example 2, which is a raw material, is too small (6.5 mass %).

Next, for the hot-melt adhesive composition of Comparative Example 7, the melt viscosity is high (4,200 mPa·s); the cloud point is more than 120° C. and high; and the peel adhesion is low (8.5 N/25 mm). Also for the composition, the odor evaluation result is low. This is because both the weight average molecular weight and Z average molecular weight of the modified hydrocarbon resin of Comparative Example 3, which is a raw material, are high (4,500 and 11,000, respectively).

Next, the hot-melt adhesive composition of Comparative Example 8 is poor in visually observed hue because the Gardner color scale of the modified hydrocarbon resin of Comparative Example 4, which is a raw material, is 9 and too high. Also for the composition of Comparative Example 8, the odor evaluation result is low. This is considered to be because the polymerization temperature was high (70° C.)

Meanwhile, for the modified hydrocarbon resins of Examples 1 to 4 (the modified hydrocarbon resin of the present invention), since the Gardner color scale is 4 or less and small, they are excellent in hue. For the hot-melt adhesive compositions of Example 5 to 8, which were obtained by using the ethylene-vinyl acetate copolymer resin and the modified hydrocarbon resins of Examples 1 to 4, respectively, since the melt viscosity is 2,800 mPa·s or less and low, the compositions are excellent in coatability. Also for the compositions, since the cloud point is 78° C. or less and low, the open time is long. Also for the compositions, since the peel adhesion is 12.3 N/25 mm or more and high, they are excellent in high-temperature adhesion performance.

The above effects are due to the following reasons: the modified hydrocarbon resin of the present invention (the modified hydrocarbon resins of Examples 1 to 4), which is a raw material, is a modified hydrocarbon resin obtained by reaction of the resin comprising 20 mass % to 70 mass % of the 1,3-pentadiene monomer unit, 10 mass % to 35 mass % of the C4-C6 alicyclic monoolefin monomer unit, mass % to 30 mass % of the C4-C8 acyclic monoolefin monomer unit, 0 mass % to 1 mass % of the alicyclic diolefin monomer unit, and 10 mass % to 40 mass % of an aromatic monoolefin monomer unit with a unsaturated carboxylic acid or unsaturated dicarboxylic anhydride, and it is such a modified hydrocarbon resin that the weight average molecular weight (Mw) of the resin is from 1,000 to 4,000; the Z average molecular weight (Mz) of the resin is from 2,500 to 10,000; the ratio (Mz/Mw) between the Z average molecular weight and the weight average molecular weight is from 1.5 to 2.5; the Gardner color scale of a 50 mass % toluene solution is 5 or less; the softening point of the resin is 30° C. or more; and the acid value of the resin is from 1 KOHmg/g to 20 KOHmg/g.

The invention claimed is:

1. A modified hydrocarbon resin comprising 20 mass % to 70 mass % of a 1,3-pentadiene monomer unit, 10 mass % to 35 mass % of a C4-C6 alicyclic monoolefin monomer unit, 5 mass % to 30 mass % of a C4-C8 acyclic monoolefin monomer unit, 0 mass % to 1 mass % of an alicyclic diolefin monomer unit, and 10 mass % to 40 mass % of an aromatic monoolefin monomer unit, and containing a carboxyl group or acid anhydride group,
    wherein a weight average molecular weight (Mw) of the resin is from 1,000 to 4,000; a Z average molecular weight (Mz) of the resin is from 2,500 to 10,000; a ratio (Mz/Mw) between the Z average molecular weight and the weight average molecular weight is from 1.5 to 2.5; a Gardner color scale of a 50 mass % toluene solution is 5 or less; a softening point of the resin is 30° C. or more; an acid value of the resin is from 1 KOHmg/g to 20 KOHmg/g; and the ratio of the total amount of a 2-methyl-2-butene monomer unit, an isobutylene monomer unit and a diisobutylene monomer unit in the C4-C8 acyclic monoolefin monomer unit is 50 mass % or more.

2. A method for producing the modified hydrocarbon resin defined by claim 1, the method comprising:

a polymerization step in which a monomer mixture A comprising 20 mass % to 70 mass % of 1,3-pentadiene, 10 mass % to 35 mass % of a C4-C6 alicyclic monoolefin, 5 mass % to 30 mass % of a C4-C8 acyclic monoolefin, 0 mass % to 1 mass % of an alicyclic diolefin, and 10 mass % to 40 mass % of an aromatic monoolefin, is cationically polymerized at 65° C. or less, using, as a polymerization catalyst, a halogenated aluminum (A) and a halogenated hydrocarbon (B) selected from the group consisting of a halogenated hydrocarbon (B1) in which a halogen atom is bound to a tertiary carbon atom and a halogenated hydrocarbon (B2) in which a halogen atom is bound to a carbon atom adjacent to a carbon-carbon unsaturated bond, and a modification step in which a resin obtained by the polymerization step is acid-modified by reaction with a unsaturated carboxylic acid or unsaturated dicarboxylic anhydride.

3. The method for producing the modified hydrocarbon resin according to claim 2, wherein, in the polymerization step, first, a mixture M is prepared by mixing the halogenated aluminum (A) and the alicyclic monoolefin, and next, the mixture M is mixed with a mixture a containing at least the 1,3-pentadiene, the acyclic monoolefin and the aromatic monoolefin.

4. The method for producing the modified hydrocarbon resin according to claim 3, wherein, in the polymerization step, the mixture a and the mixture M are further mixed with the halogenated hydrocarbon (B).

5. A hot-melt adhesive composition comprising the modified hydrocarbon resin defined by claim 1 and an ethylene-vinyl acetate copolymer.

6. The hot-melt adhesive composition according to claim 5, wherein a vinyl acetate monomer unit content of the ethylene-vinyl acetate copolymer is from 15 mass % to 35 mass %.

* * * * *